(No Model.)
L. HERMAN.
SPROCKET WHEEL.
No. 325,539. Patented Sept. 1, 1885.
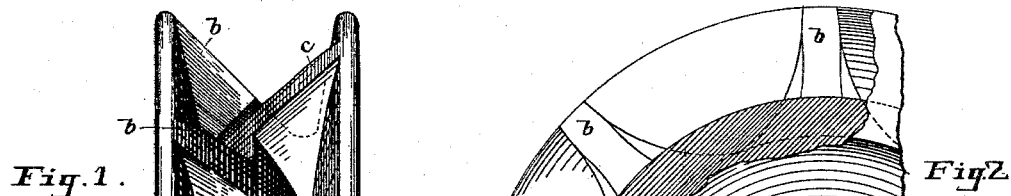
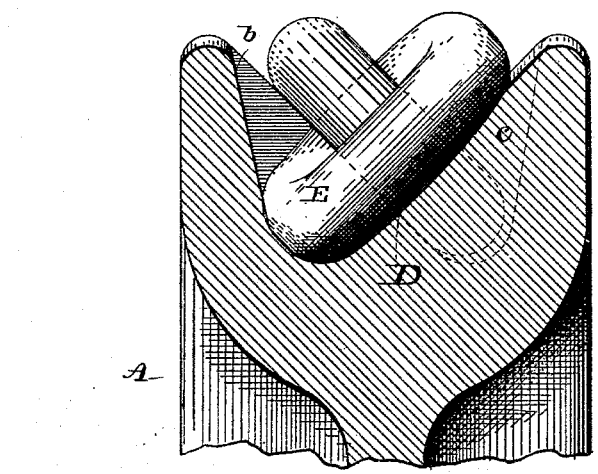
Witnesses:
N.S. Amstutz,
G.W. Shumway
Inventor-
Ludwig Herman.
By Jno. Crowell Attorney

UNITED STATES PATENT OFFICE.

LUDWIG HERMAN, OF CLEVELAND, OHIO.

SPROCKET-WHEEL.

SPECIFICATION forming part of Letters Patent No. 325,539, dated September 1, 1885.

Application filed February 24, 1885. (No model.)

*To all whom it may concern:*

Be it known that I, LUDWIG HERMAN, of Cleveland, in the county of Cuyahoga and State of Ohio, have invented certain new and useful Improvements in Sprocket-Wheels; and I do hereby declare the following to be a full, clear, and exact description of the invention, such as will enable others skilled in the art to which it pertains to make and use the same.

My invention relates to improvements in sprocket-wheels, the object being to provide a sprocket-wheel that will bear alike on all of the links of the chain, and is so constructed as to avoid excessive friction as the chain enters or leaves the wheel.

With this object in view my invention consists in certain features of construction and in combination of parts, hereinafter described, and pointed out in the claims.

Heretofore sprocket-wheels for chains have usually had one set of sprockets set substantially radially, that respectively entered alternate links of the chain; or, if the links were too short for this, the sprockets were arranged in pairs opposite each other, and engaged opposite sides of the same links between the ends of the next adjacent links. In either case one set of links stood edgewise and the other set laid flatwise on the wheel. With such construction the different sets of links were subjected to unequal strain, the friction and wear were excessive, and the chain would not always leave the sprocket-wheel freely.

My improved sprocket-wheel is illustrated in the accompanying drawings.

Figure 1 is a face view of my improved sprocket-wheel. Fig. 2 is a partial plan view, partly in section, of the wheel. Fig. 3 is a transverse section of the wheel, showing the chain in position.

A represents the wheel provided with the annular flaring flanges B and C. Located between the flanges is the annular ridge D, the faces of which join each other at the apex at approximately a right angle. The sides of this ridge, near the base, are curved outward and join the base of the respective flanges B and C. These curves correspond with the shape of the chain-link.

Sprockets $b$ and $c$ are located on the respective rims at equal distances apart, and so arranged that the sprockets of one rim are midway between the sprockets of the opposite rim. The face of a sprocket joins the ridge D at the apex of the latter, and is in line with the face of the ridge that slopes toward the opposite rim. The face of each sprocket is therefore at about an angle of forty-five degrees to the central plane of the wheel. Alternate links of the chain, in passing on the wheel, will lie flatwise against the sprockets on the rim, and the intermediate links will lie flatwise on the sprockets on the opposite rim. The two sets of links will be similarly situated and approximately at right angles to each other. A sprocket will engage the central portion of a link between the ends of the engaging links, and the lower edge of each link will fit in between the sprockets of the opposite rim.

The sprockets are so shaped at the lower end that they will retain each link in position and then recede in an appropriate curve, so as to allow the chain to enter and leave the wheel without interference. The chain in such position moves easily and with little friction, and the different links each perform an equal amount of the labor and are subject to an equal amount of wear. There is no binding or cramping of the links, and the chain leaves the wheel as freely as it would leave a flat pulley or drum, and the friction and wear are reduced to a minimum.

In the drawings I have shown a wheel intended to be used with straight-link cable-chains, the recesses between the sprockets made to accommodate links of that character; but I do not limit myself in any degree to specific conformation of the recesses, as other styles of chain and consequent form of recesses may be used without departing from my invention.

What I claim is—

1. In a sprocket-wheel, sprockets and recesses arranged in such order that each link as it passes over the wheel will occupy a recess upon one side of the wheel formed by two sprockets and bear against the sprocket upon the opposite side, substantially as set forth.

2. In a sprocket-wheel, the combination, with a central annular ridge, of sprockets so arranged that the bearing-surface of the sprockets for a chain-link is a continuation of one face of the annular ridge, substantially as set forth.

3. In a sprocket-wheel, the combination, with a central annular ridge, of sprockets arranged in such order that the wheel bears upon all links of the chain alike, substantially as set forth.

In testimony whereof I sign this specification, in the presence of two witnesses, this 19th day of February, 1885.

LUDWIG HERMAN.

Witnesses:
N. S. AURSTUTZ,
G. W. SHUMWAY.